United States Patent
Simmons et al.

(10) Patent No.: US 8,538,672 B2
(45) Date of Patent: Sep. 17, 2013

(54) 2D-COIL COLLISION SENSOR SYSTEM

(75) Inventors: Paul Simmons, Chesterfield, MI (US);
Manoharprasad K. Rao, Novi, MI (US); Clay Maranville, Ypsilanti, MI (US); Richard Soltis, Saline, MI (US); David Bauch, South Lyon, MI (US)

(73) Assignee: Ford Global Technologies, Dearborn, MI (US)

( * ) Notice: Subject to any disclaimer, the term of this patent is extended or adjusted under 35 U.S.C. 154(b) by 1787 days.

(21) Appl. No.: 11/533,941

(22) Filed: Sep. 21, 2006

(65) Prior Publication Data

US 2008/0077328 A1     Mar. 27, 2008

(51) Int. Cl.
*G06F 17/10* (2006.01)
*G06G 7/78* (2006.01)
*G08G 1/16* (2006.01)
*B60Q 1/00* (2006.01)

(52) U.S. Cl.
USPC ............................ 701/301; 340/435; 340/436

(58) Field of Classification Search
USPC .................. 701/301; 340/903, 435, 436
See application file for complete search history.

(56) References Cited

U.S. PATENT DOCUMENTS

| | | | |
|---|---|---|---|
| 4,866,418 A | 9/1989 | Dobler et al. | |
| 4,987,781 A | 1/1991 | Reimann | |
| 5,707,076 A | 1/1998 | Takahashi | |
| 6,131,457 A | 10/2000 | Sato | |
| 6,698,272 B1 | 3/2004 | Almirante | |
| 6,777,927 B1 | 8/2004 | Bomya | |
| 7,209,844 B2 * | 4/2007 | Merrick et al. | 702/65 |
| 2002/0079908 A1 * | 6/2002 | Hohl | 324/654 |
| 2004/0056652 A1 * | 3/2004 | Bomya | 324/207.17 |
| 2007/0024277 A1 * | 2/2007 | Cech et al. | 324/239 |

FOREIGN PATENT DOCUMENTS

JP    11326364    11/1999

* cited by examiner

*Primary Examiner* — Thomas Tarcza
*Assistant Examiner* — Imran Mustafa
(74) *Attorney, Agent, or Firm* — Angela M. Brunetti; Frank MacKenzie

(57) ABSTRACT

A collision sensing system for a vehicle (10) includes a two-dimensional coil sensor (14) that is attached to a vehicle structure (19) A controller (20) is in communication with the two-dimensional coil sensor (14) and detects a collision event in response to movement of the vehicle structure (19) relative to a conductive member (98) of the vehicle (10). A collision detection and safety countermeasure system (12) for a vehicle (10) includes a coil sensor (14) that is adhered to a vehicle structure (19). A controller (20) is in communication with the coil sensor (14) and generates a countermeasure signal in response to movement by the vehicle structure (19) relative to a conductive member (98) of the vehicle (10).

20 Claims, 4 Drawing Sheets

2D-COIL COLLISION SENSOR SYSTEM

TECHNICAL FIELD

The present invention relates to vehicle electronic and electrical systems and components, and to vehicle collision and countermeasure systems and devices. More particularly, the present invention is related to the monitoring and detection of a collision within a vehicle and the structural displacement and velocity experienced therefrom.

BACKGROUND OF THE INVENTION

Collision detection and countermeasure systems provide a vehicle operator knowledge and awareness of objects or vehicles within a close proximity so as to prevent colliding with those objects. Countermeasure systems exist in various passive and active forms. Some countermeasure systems are used to aid in the prevention of a collision others are used to aid in the prevention of an injury to a vehicle operator.

Certain collision detection and countermeasure systems are able to sense a vehicle or object that is in a close proximity to a host vehicle and to warn the host vehicle operator, such that the operator can take precautionary steps to prevent a collision or injury. Other collision detection and countermeasure systems activate passive or active countermeasures such as airbags, load limiting seatbelts, or brake controls whereby the system itself aids in preventing a collision or injury.

An ongoing concern for safety engineers is to provide a safer automotive vehicle with increased collision detection and safety countermeasure intelligence as to decrease the probability of a collision or an injury. It is desired that such intelligence be provided by a system or systems that are simple in design, lightweight, compact, and cost effective.

Currently side collision sensing systems use accelerometers or pressure based sensors that are attached to the body structure of a vehicle in areas in which collision detection is desired. Accelerometer based devices, generally, have rigid attachment requirements to enable detection through the vehicle body structure. Considerable time is spent and detailed procedures are used to assure that the sensors are carefully and properly attached to the body structure.

In addition, current electronic and electrical systems that are utilized on automotive vehicles need to pass stringent electromagnetic compatibility requirements. This is especially true with respect to safety systems and collision detection and countermeasure systems. Electromagnetic compatibility, in short, refers to the ability of a system to be unaffected by and to not affect or interfere with other electronic or electrical systems within a vehicle. Electromagnetic compatibility can also refer to the ability of a system to be impervious to nearby electronic or electrical systems or, for example, magnetic fields that are external to or that may be experienced by a vehicle during normal operation.

Thus, there is a need for an improved collision detection and safety countermeasure system for side impact collision events and the like that overcomes the drawbacks associated with prior sensing systems. It is desirable that the improved system provide increased speed and reliability.

SUMMARY OF THE INVENTION

In one embodiment of the present invention, a collision sensing system for a vehicle is provided that includes a two-dimensional coil sensor that is attached to a vehicle structure. A controller is in communication with the two-dimensional coil sensor and detects a collision event in response to movement of the vehicle structure relative to a conductive member of the vehicle.

In another embodiment of the present invention a collision detection and safety countermeasure system for a vehicle is provided. The countermeasure system includes a coil sensor that is adhered to a vehicle structure. A controller is in communication with the coil sensor and generates a countermeasure signal in response to movement by the vehicle structure relative to a conductive member of the vehicle.

The present invention provides several advantages One advantage provided by an embodiment of the present invention is a collision detection system with a collision sensor that provides increased speed and reliability while at the same time being compact, simple in design, light weight, and cost effective.

Another advantage provided by another embodiment of the present invention is a collision detection system that incorporates a flexible collision sensor, which can take on various sizes and shapes, and is versatile such that it may be applied on any structure within a vehicle.

Still another advantage provided by another embodiment of the present invention is a collision detection and safety countermeasure system that feasibly permits collision monitoring of any number of points on a vehicle, including points on the front, the rear, and the sides of the vehicle. This allows for increased vehicle intelligence, which may be used in assessing a potential collision situation and in taking steps to perform countermeasures.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

Figure 1:
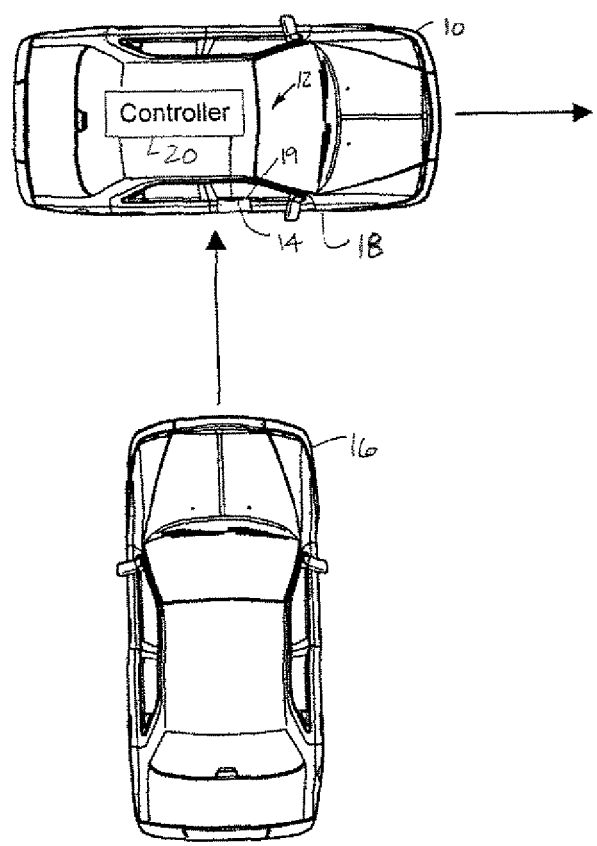
FIG. 1 is a top view of a potential collision event of a vehicle that has a collision detection and safety countermeasure system, which incorporates a magnetic coil-based collision detection sensor in accordance with an embodiment of the present invention.

In each of the following figures, the same reference numerals are used to refer to the same components. While the present invention is described primarily with respect to sensors and systems for detecting a collision event, the present invention may be adapted to various vehicle and non-vehicle applications. The present invention may apply to automotive, aeronautical, nautical, and railway industries, as well as to other industries that utilize collision detection systems. The present invention may be applied in commercial and non-commercial settings. The present invention may be utilized in the detection of a collision to initiate the performance of countermeasures.

Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Also, in the following description the term "performing" may include activating, deploying, initiating, powering, and other terms known in the art that may describe the manner in which a passive countermeasure may be operated or initiated.

Additionally, in the following description various countermeasures are discussed. The countermeasures may be reversible or irreversible. Reversible countermeasures refer to countermeasures that may be reset to their original form or used repeatedly without a significant amount of functional deficiency, which may be determined by a system designer. Irreversible countermeasures refer to countermeasures, such as airbags that once deployed are not reusable.

Figure 2:
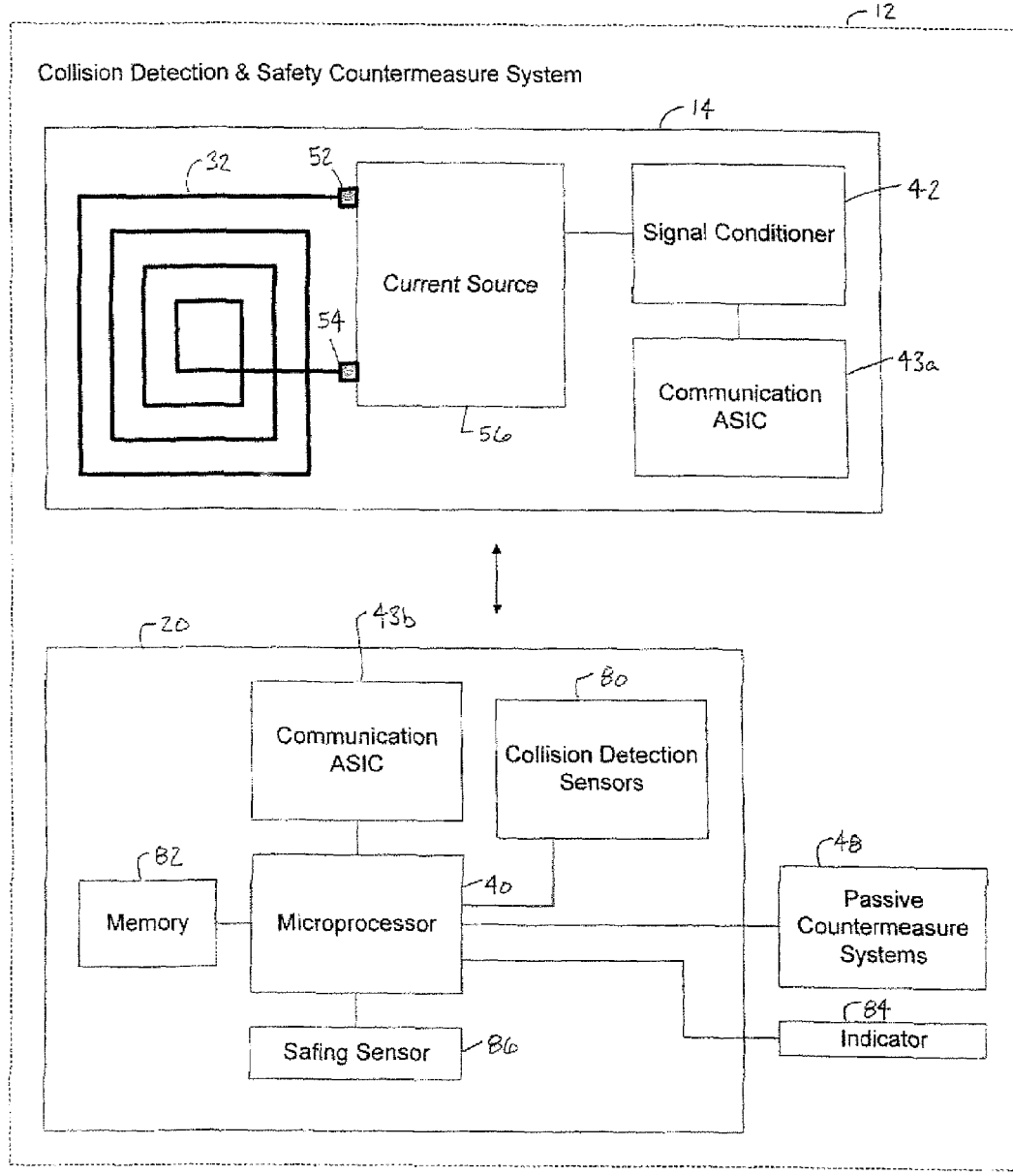
FIG. 2 is a block diagrammatic view of the collision detection and safety countermeasure system of FIG. 1.

Referring now to FIG. 1, a top view of a potential collision event of a host vehicle 10 that has a collision detection and safety countermeasure system 12, which incorporates a magnetic coil-based collision detection sensor 14, is shown in accordance with an embodiment of the present invention. In FIG. 1, an impending vehicle 16 is shown on course to collide with the side 18 of the host vehicle 10. The coil-based sensor 14 is mounted on a vehicle structure 19 and is used to detect a collision with the host vehicle 10 by the impending vehicle 16. In the embodiment shown, the vehicle structure 19 is in the form of a door panel. The coil-based sensor 14 includes a coil that generates a magnetic field. An example of such a coil is best seen in FIG. 2. A controller 20, which is in communication with the coil-based sensor 14, detects changes in that magnetic field. Upon contact with the host vehicle 10 by the impending vehicle 16, the controller 20 detects movement of the vehicle structure 19 via the coil-based sensor 14, thereby, detecting a collision event.

Referring now to FIG. 2, a block diagrammatic view of the collision detection and safety countermeasure system 12 in accordance with an embodiment of the present invention is shown. The countermeasure system 12 includes the coil-based sensor 14 and a controller 20 that is in communication therewith. The coil-based sensor 14 includes a 2D coil transceiver 32, a signal conditioner 42, a current source 56, and a communication device, such as a first communication application specific integrated circuit (ASIC) 43a, as shown. The controller 20 includes a microprocessor 40, which is coupled to a second communication device, such as a second communication ASIC 43b, as shown. The coil-based sensor 14 and the controller 20, in addition or alternative to that shown, may include signal conditioning devices, such as amplifiers, filters, converters, multiplexing devices, demultiplexing devices, and other signal conditioning devices known in the art. Also, the signal conditioner 42 may be located in the controller 20, as opposed to in the coil-based sensor 14.

The coil-based sensor 14 may be located anywhere on a vehicle, such as in or on a bumper, a door panel, a hood, a trunk lid, a corner panel, a rocker panel, a frame, a fender, a pillar, a roof, or on any other structure of a vehicle. Although one coil-based sensor 14 is shown, any number may be utilized and each of which may include any number of logic or Integrated Circuit (IC) devices. The coil-based sensor 14 may be in the form of a single printed circuit or may be in the form of multiple individual components. In one example embodiment, the coil-based sensor 14 is in the form of a single flexible laminated member that can be adhered or attached to a surface of an object or vehicle structure.

The coil-based sensor 14 is shown, with respect to the embodiment of FIG. 2, as a two-dimensional sensor. However, one skilled in the art would envision similar three-dimensional configurations including the three-dimensional expansion of a single coil, the stacking of multiple coils, or other configurations and arrangements The two-dimensional coil-based sensor 14 has a single continuous coiled element transceiver 32 that is conductive. The conductive transceiver 32 may be attached to a non-conductive vehicle structure, may be attached to a conductive vehicle structure via a non-conductive object or material layer, may be mounted on or formed integrally within a non-conductive member or layer and attached to a vehicle structure, may be laminated and attached to a vehicle structure, or attached using some other suitable technique. Another example attachment technique includes adhesively attaching the coil-based sensor 14 to a vehicle structure. The transceiver 32 may be formed of various conductive materials, such as copper, aluminum, carbon or other suitable conductive materials.

Electrical current is supplied to the source terminal 52 via the current source 56, which is coupled between the source terminal 52 and the signal conditioner 42 of the transceiver 32. The current source 56 may include a transmitter-circuit designated battery (not shown), may receive power from a vehicle battery (not shown), or may receive power or current from some other vehicle power or current source that is known in the art.

The amount of current supplied to the transceiver 32 is minimal and the frequency of that current is generally high. In one embodiment of the present invention, the current supplied is approximately between 10-20 mA, is an alternating current (AC), and the frequency of that current is approximately 20-30 kHz. The low current and high frequency levels minimize the power requirements and prevent the interference with and from other vehicle systems and increase the robustness of the collision detection and safety countermeasure system 12 to vehicle external electronic, electrical, and magnetic systems and sources. Of course, the current and frequency levels may vary per application.

Figure 3:
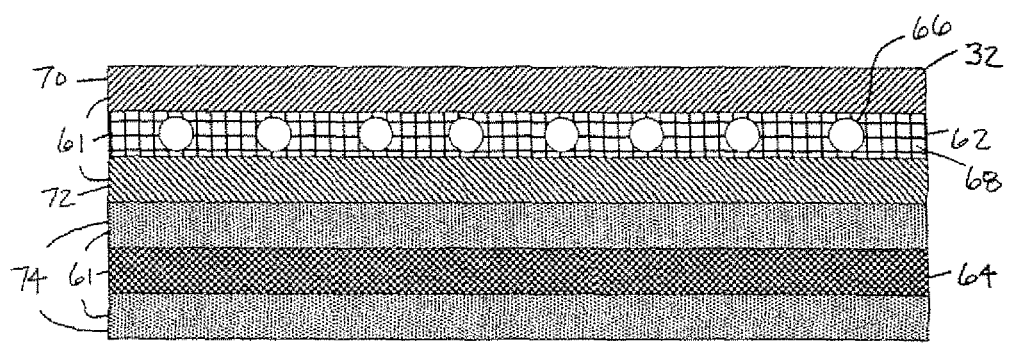
FIG. 3 is a side cross-sectional view of a laminated coil-based sensor in accordance with an embodiment of the present invention.

Referring now to FIG. 3, a side cross-sectional view of a laminated coil-based transceiver 32' is shown in accordance with an embodiment of the present invention. The laminated coil-based transceiver 32' includes multiple layers 61, one of which is a coil layer 62 that has a coil element 66 embedded or formed therein. The coil layer 62 is applied to a base layer or substrate layer 64. The coil layer 62 may consist solely of a coil element or may consist of a coil element 66 disposed within a flexible coil surrounding material 68, as shown. The coil element 66 may be painted on, applied on, adhered to, etched on, or formed on the substrate layer 64 using other known techniques. A top protective laminating layer 70 may be applied on the coil layer 62. The flexible coil surrounding material 68, the substrate layer 64, and the protective layer 70 may be formed of various materials, such as polymide resin (for example "Capton™"), nylon, paper, cardboard, plastic, elastomer, urethane, epoxy, silicone, polymer, fiber, film, or other similar or suitable materials. When flexible materials are utilized increased versatility is provided in location feasibility of use. Flexible and non-flexible materials may be used.

As shown, an additional or lower laminating layer 72 may be utilized between the coil layer 62 and the substrate layer 64. In addition, the substrate layer 64 may be utilized as a lower laminating layer and as an alternative to the lower laminating layer 72.

One or more adhesive layers 74 may also be included. The adhesive layers 74 may be applied to any of the above-stated layers and used to couple the layers 61 or to attach of the coil-based transceiver 32' to a vehicle structure. The adhesive layers 74 may consist of an adhesive paste, an adhesive tape, a coating, or other adhesive material known in the art.

Referring again to FIG. 2, the controller 20 may be remotely located on a vehicle away from the coil-based sensor 14. The controller 20, in addition to the microprocessor 40 and the passive countermeasure systems 48 may include collision detection sensors 80, other than the coil-based sensor 14, a safing sensor 86, and a memory 82.

The controller 20 may be a portion of a central vehicle main control unit, an electronic control unit, an interactive vehicle dynamics module, a restraints control module, a main safety or collision controller, or may be a stand-alone controller. Block 40 may be a microprocessor such as a computer having a central processing unit, memory (RAM and/or RON), and associated input and output buses. In addition or alternative to the microprocessor 40 an ASIC or other logic device(s) known in the art may be used. In addition, the controller 20 may be coupled to a variety of passive countermeasure systems 48.

The passive countermeasure systems 48 may include internal airbag control, seatbelt control, knee bolster control, head restraint control, load limiting pedal control, load limiting steering control, and pretensioner control. Pretensioner control may include control over pyrotechnic and non-pyrotechnic seatbelt pretensioners. Airbag control may include control over front, side, curtain, hood, dash, or other types of airbags.

The indicator 84 may also be used to provide a status of a vehicle component, structure, or system. The indicator 84 may be of various types and styles and provide short circuit or fault condition information. The indicator 84 may include LEDs, lights, displays, a video system, an audio system, a heads-up display, a flat-panel display, a telematic system or other indicators known in the art.

The memory 82 may include RAM, ROM, SRAM, DRAM, PROM, EPRON, EEPROM, NVRAM, FLASH, or any other style of memory known in the art. The memory 82 may be located within the controller or external to the controller. In one embodiment, a non-volatile memory such as PROM is used.

Figure 4:
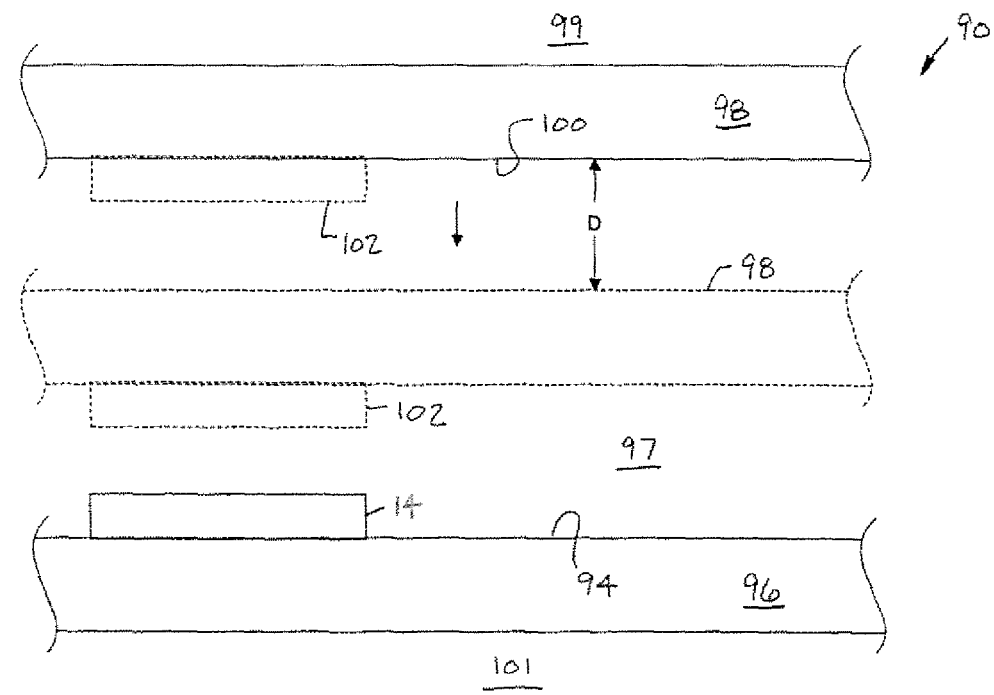
FIG. 4 is a top cross-sectional view of a vehicle door that has the coil-based sensor of FIG. 1 attached thereon in accordance with an embodiment of the present invention.

Referring now to FIG. 4, a top cross-sectional view of a vehicle door 90 with the coil-based sensor 14 attached thereon, is shown in accordance with an embodiment of the present invention. The coil-based sensor 14 is attached to the inner side 94 of an inner door panel 96 in a door cavity 97. Area 99, generally, represents the environment external to the door 90. Area 101, generally, represents the interior of the associated vehicle or passenger cabin. During a collision event, the magnetic field generated by the coil-based sensor 14 is altered by the intrusion, deformation, or movement of the outer door panel 98 relative to the coil-based sensor 14. Note that any number of coil-based sensors may be used along the door 90.

The outer door panel 98 performs as a conductive member. When the outer door panel 98 is not formed of a conductive material, a conductive element or member, or a second coil-based sensor 102 may be attached to the second inner side 100 of the outer door panel 98. The second coil-based sensor 102 is positioned opposite the coil-based sensor 14. Item 102 represents either the added conductive member or the second coil-based sensor, depending upon the application. In general, the conductive member 102 may be in the form of conductive panel, a frame, a sheet metal panel, a conductive pad, a conductive strip, a coating, a conductive layer, a conductive film, or other known conductive member. As an alternative embodiment, the coil-based sensor 14 may be mounted on the second inner side 100, and the inner panel 96 may serve as a conductive member or a conductive member may be on the first inner side 94. When a second coil-based sensor is utilized, movement of the outer door panel 98 may be detected in response to changes in attracting or opposing magnetic fields generated by the coils of each sensor.

Figure 5:
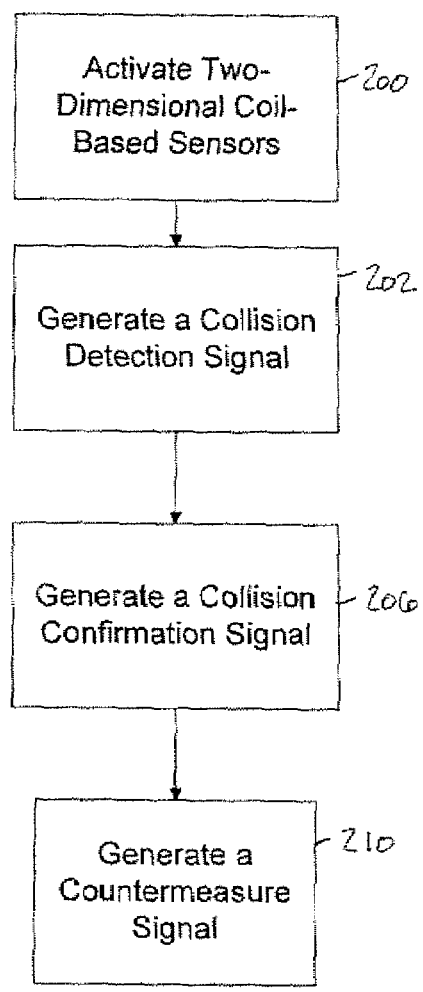
FIG. 5 is a logic flow diagram illustrating a method of performing a countermeasure in accordance with an embodiment of the present invention.

Referring now to FIG. 5, a logic flow diagram illustrating a method of performing a countermeasure including detecting collision with a vehicle structure is shown in accordance with an embodiment of the present invention.

In step 200, one or more magnetic coil-based sensors, such as one or more of the coil-based sensors 14 of FIGS. 1-3, are activated to generate one or more magnetic fields. A controller, such as controller 20 of FIGS. 1-2, may generate an activation signal. The magnetic fields may be activated via a controller designated transmission circuit, such as the communication ASICs 43a and 43b of FIG. 2. Current levels and frequencies of transmission may be determined prior to transmission or using predetermined values.

In step 202, upon change in the magnetic fields, the controller generates a collision detection signal. The collision detection signal is indicative of an alteration in a conductive member of the vehicle. That alteration may be associated with a collision. As the magnetic field changes across the coil-based sensors, the power in the coil-based sensors changes. This power change is detected through change in voltage across the coils. The voltage V of each coil-based sensor is monitored and is directly proportional to the time rate of change in the current I through the associated coils. This is represented by equation 1 where L is the inductance of the particular transceiver.

$$V = L\frac{dI}{dt} \tag{1}$$

When changes occur in mutually coupled coils or between a coil and a conductive member the impedance of the coil is affected by the magnetic coupling. The voltage change over-time across the coil(s) provides a direct relationship to the rate of distance change between the coils or the coil and the conductive member, which is sometimes referred to as the cavity gap closure. The closure rate of the gap is detected and measured by the controller as a change in the V(t) relationship as provided by equation 2, where M is the mutual inductance between the coil and the conductive member.

$$V(t) = M\frac{dI}{dt} \tag{2}$$

The mutual inductance M is related to the distance D between the coil(s) or the coil and the conductive member, as shown by equation 3, where k is the system dependent constant.

$$M = \frac{K}{D^2} \quad (3)$$

The controller continuously monitors the coil-based sensors. When a collision occurs, the controller proceeds to step 206.

In step 206, when a collision occurs, a safing sensor, such as the safing sensor 86, generates a collision confirmation signal. Step 206 may be performed simultaneously with or prior to step 202. In step 210, the controller generates a countermeasure signal in response to the collision detection signal and the confirmation signal. The countermeasure signal may be utilized to activate one or more passive countermeasure systems. When the collision detection signal is greater than a first predetermined threshold level and the confirmation signal is greater than a second predetermined threshold a countermeasure is activated. A table of threshold values or ranges may be utilized in determining how and to what extent countermeasures are activated and performed.

The above-described steps are meant to be illustrative examples only; the steps may be performed sequentially, synchronously, simultaneously, or in a different order depending upon the application.

The present invention provides a flexible, lightweight, compact, simple, inexpensive sensor that may be utilized in a vehicle to detect collision thereto. The present invention also provides a system that incorporates any number of the stated sensors to provide a collision status indication.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A collision-sensing system for a vehicle having structure that includes a conductive element, said collision-sensing system comprising:
    a transceiver including a coil element that is arranged in a substantially two-dimensional configuration and mountable to said structure of said vehicle so that said coil element is situated at a distance away from said conductive element; and
    a controller operable to control said transceiver so as to generate and sense a magnetic field via said coil element;
    wherein said controller is operable to detect a vehicle collision event by sensing a change in said magnetic field, which is indicative of a change in said distance between said conductive element and said coil element caused by collision-induced deformation of said structure of said vehicle.

2. A collision-sensing system as set forth in claim 1, wherein said transceiver further includes a first application-specific integrated circuit (ASIC) coupled to said coil element, said controller includes a processor and a second ASIC coupled to said processor, and said transceiver and said controller are operable to wirelessly communicate with each other via said first ASIC and said second ASIC.

3. A collision-sensing system as set forth in claim 1, wherein said coil element is mountable to said structure of said vehicle via adhesion.

4. A collision-sensing system as set forth in claim 1, wherein said transceiver further includes a base layer over which said coil element is disposed and by which said coil element can be mounted to said structure of said vehicle.

5. A collision-sensing system as set forth in claim 1, wherein said transceiver further includes a protective lamination layer disposed over said coil element.

6. A collision-sensing system as set forth in claim 1, wherein said transceiver further includes an adhesive layer over which said coil element is disposed and by which said coil element can be mounted to said structure of said vehicle.

7. A collision-sensing system as set forth in claim 1, wherein said coil element has at least two terminals, and said controller is operable to communicate with said at least two terminals.

8. A collision-sensing system as set forth in claim 1, wherein said coil element is at least part of a printed circuit.

9. A collision-sensing system as set forth in claim 1, said collision-sensing system further comprising a signal conditioner coupled between said coil element and said controller.

10. A collision-sensing system as set forth in claim 1, wherein said controller is operable to determine a velocity of said conductive element relative to said coil element according to said change in said magnetic field.

11. A collision-sensing system as set forth in claim 1, wherein said conductive element comprises another coil element.

12. A collision detection and countermeasure activation system for a vehicle having (i) structure that includes a conductive element and (ii) an onboard safety countermeasure, said system comprising:
    a transceiver including a coil element that is arranged in a substantially two-dimensional configuration and mountable to said structure of said vehicle so that said coil element is situated at a distance away from said conductive element; and
    a controller operable to control said transceiver so as to generate and sense a magnetic field via said coil element;
    wherein said controller is operable to detect a vehicle collision event by sensing a change in said magnetic field, which is indicative of a change in said distance between said conductive element and said coil element caused by collision-induced deformation of said structure of said vehicle; and
    wherein said controller, upon detecting said vehicle collision event, is operable to generate a countermeasure signal for activating said safety countermeasure aboard said vehicle.

13. A collision detection and countermeasure activation system as set forth in claim 12, wherein said transceiver further includes a first application-specific integrated circuit (ASIC) coupled to said coil element, said controller includes a processor and a second ASIC coupled to said processor, and said transceiver and said controller are operable to wirelessly communicate with each other via said first ASIC and said second ASIC.

14. A collision detection and countermeasure activation system as set forth in claim 12, wherein said transceiver further includes an adhesive layer over which said coil element is disposed and by which said coil element can be mounted to said structure of said vehicle.

15. A collision detection and countermeasure activation system as set forth in claim 12, wherein said safety countermeasure is a passive type of countermeasure, and said countermeasure signal is servable to activate said passive type of countermeasure.

16. A collision detection and countermeasure activation system as set forth in claim 12, wherein said controller is operable to determine a velocity of said conductive element relative to said coil element according to said change in said magnetic field.

17. A collision detection and countermeasure activation system as set forth in claim 12, wherein said conductive element comprises another coil element.

18. A collision detection and countermeasure activation system as set forth in claim 12, wherein said transceiver further includes a protective lamination layer disposed over said coil element.

19. A method of detecting a collision event on a vehicle having structure that includes a conductive element, said method comprising the steps of:

operating a transceiver that includes a coil element, which is arranged in a substantially two-dimensional configuration and mounted to said structure of said vehicle so that said coil element is situated at a distance away from said conductive element, so as to generate and sense a magnetic field via said coil element; and operating said transceiver so as to sense a change in said magnetic field via said coil element, said change in said magnetic field being indicative of a change in said distance between said conductive element and said coil element caused by collision-induced deformation of said structure of said vehicle.

20. A method as set forth in claim 19, said method further comprising the steps of:

operating a controller in response to said change in said magnetic field so as to generate a collision signal indicative of detection of a vehicle collision event; and operating said controller in response to said collision signal so as to generate a countermeasure signal for activating a safety countermeasure aboard said vehicle.

\* \* \* \* \*